Dec. 28, 1937.    S. W. NELDNER    2,103,914
MEAT TENDERER
Filed Feb. 6, 1936    3 Sheets—Sheet 1

Inventors
S. W. Neldner
By
Attorneys

Dec. 28, 1937.  S. W. NELDNER  2,103,914
MEAT TENDERER
Filed Feb. 6, 1936  3 Sheets-Sheet 2

Inventor
S. W. Neldner
By
Attorneys

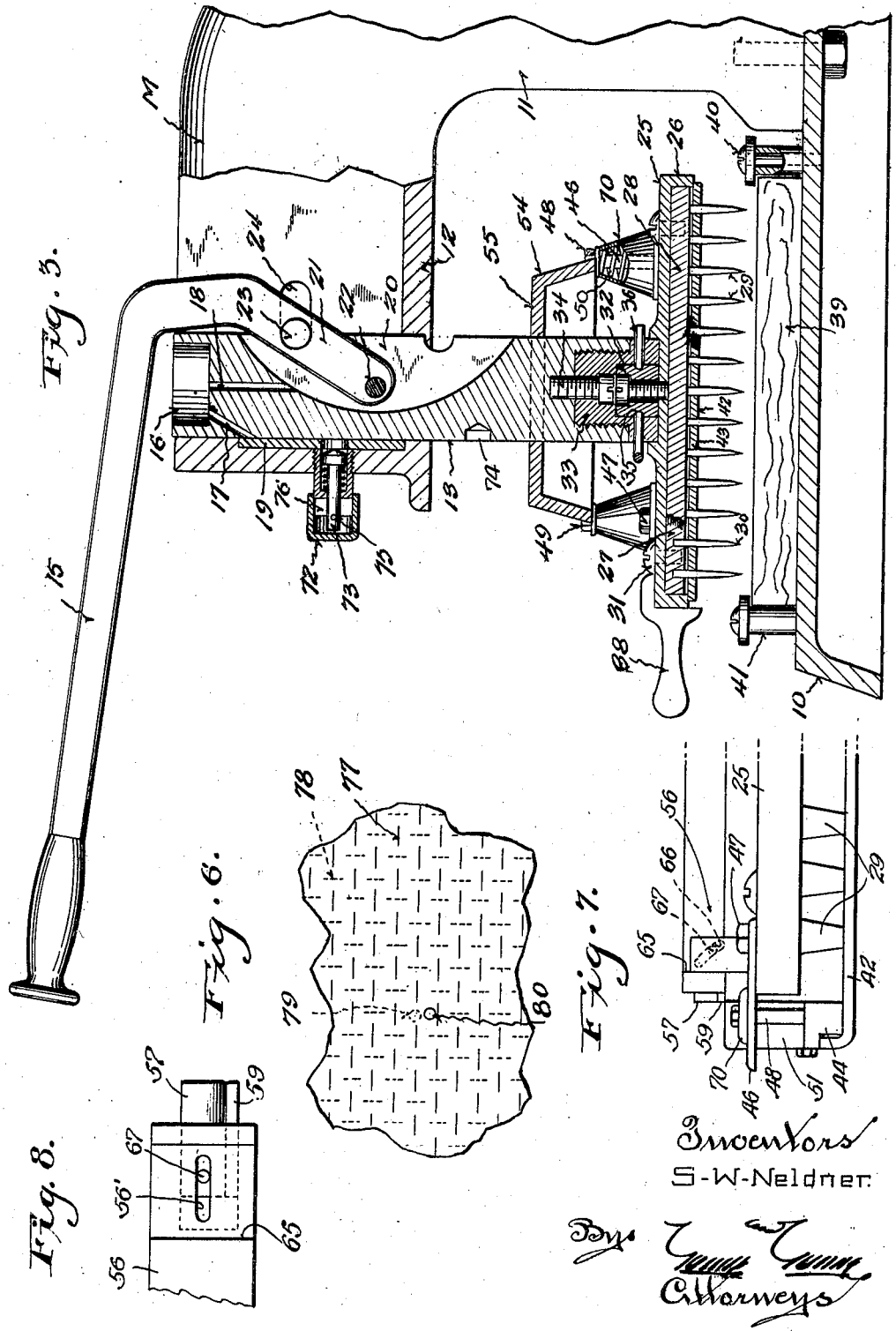

Patented Dec. 28, 1937

2,103,914

UNITED STATES PATENT OFFICE 2,103,914

MEAT TENDERER

Stephen W. Neldner, Milwaukee, Wis.

Application February 6, 1936, Serial No. 62,620

9 Claims. (Cl. 17—25)

This invention appertains to butchering, and more particularly to a novel appliance for meat markets, hotels, restaurants and the like for facilitating the tendering of meats, whereby practically all cuts of meats can be conveniently utilized on the table.

One of the primary objects of my invention is to provide a machine for quickly and expeditiously tendering meats with a minimum amount of effort and time on the part of an operator.

Another salient object of my invention is the provision of a meat tenderer embodying a vertically movable head carrying a plurality of gangs or rows of spaced cutting knives, with means for forcibly raising and lowering the head toward and away from a cutting board for uniformly making a series of cuts in and through the meat.

Another important object of my invention is the provision of novel means for removably and rotatably mounting the head on the reciprocating plunger, whereby said head can be quickly removed for cleaning and the like and turned on the plunger to cleanly cut the meat at right angles and between the first rows of cuts made in the meat.

A further object of my invention is the provision of a reciprocating stripper plate carried by the reciprocating head for stripping the meat from the knives after the insertions have been made in the meat, and after the head has been raised to its inoperative position.

A further object of my invention is the provision of means for automatically actuating the stripper plate when the head has been raised to a predetermined position for moving the plate below the knives, with means for quickly and automatically releasing the stripper plate, so that the same will return to its normal raised position after the meat has been removed from the knives.

A further important object of my invention is the provision of novel means for forming the head, the stripper plate, and the means for automatically actuating the stripper plate, whereby all of these parts will operate quickly and efficiently without undue wear, means being provided for compensating for wear and for replacing parts that may become unduly worn.

A further object of my invention is the provision of novel operating means for actuating the plunger for the head, whereby the plunger and head can be raised a maximum distance for receiving relatively thick steaks, and whereby the plunger and head can be quickly urged through a piece of meat without undue exertion on the part of the operator.

A still further object of my invention is to provide a meat tenderer of the above character, one which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 3 is a central longitudinal section through the improved machine, with the head in its lowered position.

Figure 6 is a fragmentary, detail plan view, illustrating the cuts made in a piece of meat.

Figure 7 is a fragmentary, detail edge elevation of the cutter head, showing the stripper plate in its lowered position for stripping the meat from the cutting knives.

Figure 8 is a fragmentary side elevation of one of the arms of the trip head, the releasing dog being omitted to illustrate the formation of said arm.

Figure 1:
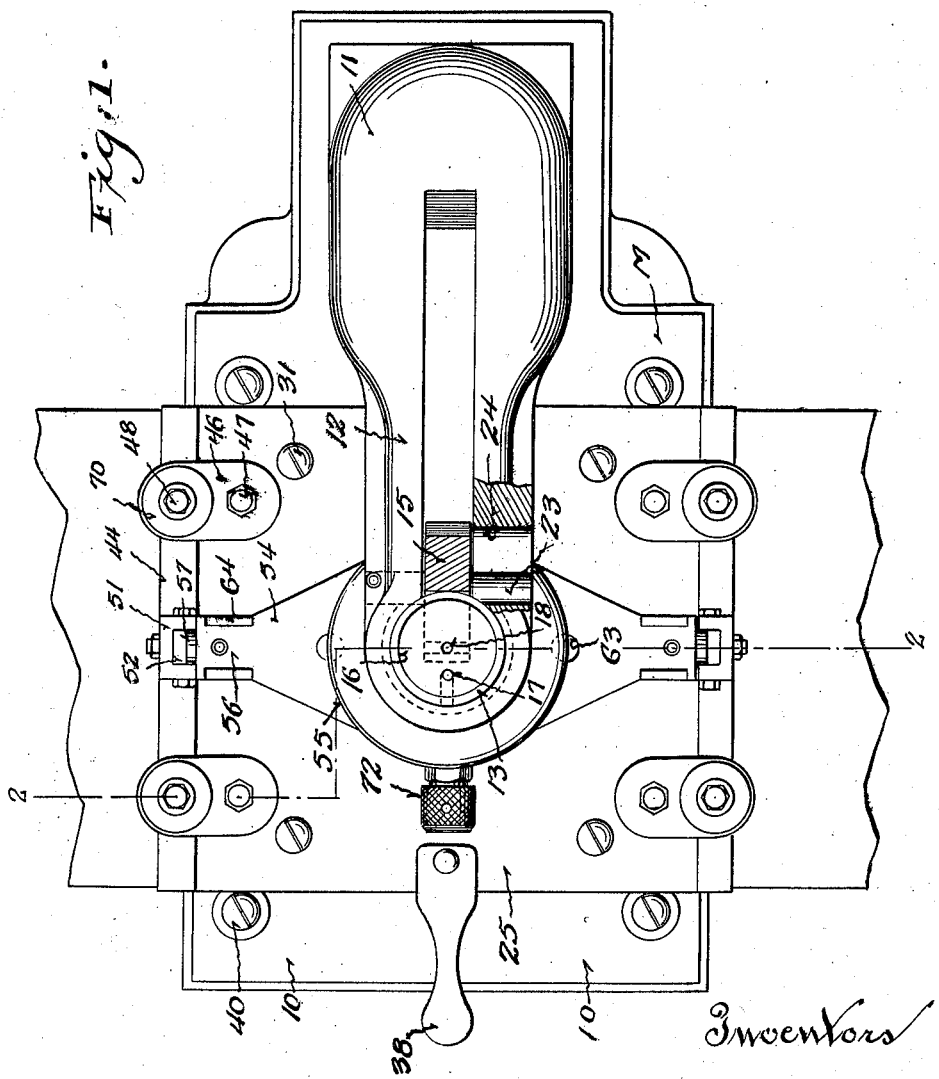
Figure 1 is a fragmentary top plan view of the improved meat tendering machine, with parts thereof broken away and in section.

Referring to the drawings in detail, wherein similar reference characters designate corresponding parts throughout the several views, the letter M generally indicates the improved machine, which comprises a base 10 having formed thereon at one end thereof a pedestal or standard 11. The pedestal or standard 11 has formed on its upper end a forwardly extending arm or head 12, which overlies the central part of the base 10, and this arm slidably receives the operating plunger 13.

The plunger 13 carries the cutter head, which forms one of the salient features of the invention. This head is moved toward and away from the base 10 by means of an operating lever 15. The arrangement and construction of the operating lever 15 also forms an important part of the invention, as by the use of the lever the head can be raised a relatively great distance above the base 10 for receiving meats of relatively great thickness, and can be urged toward the meat for bringing about the cutting of the same with a minimum amount of exertion.

The plunger 13 is of a substantially cylindrical construction and the arm 12 is formed with a suitable bearing for receiving the same. Any preferred means can be provided for lubricating the bearing and the plunger during the reciprocation thereof, and, as shown, the upper end of the plunger is provided with an oil well 16 and oil ways 17 and 18 communicating therewith. The oil way 17 leads toward the side of the plunger and is adapted to supply oil to a lubricating pad 19 carried by the bearing.

One side of the plunger 13 is provided with a slot 20 in which is received the crank-arm 21 formed on the lever 15. The forward end of the crank-arm 21 is connected to the plunger by means of a diametrically extending pivot pin 22. The lever is pivotally and slidably connected with the arm 12 of the pedestal or standard 11 by means of a transversely extending pivot pin 23 rigidly carried by the crank 21. The opposite ends of the pivot pin 23 are slidably and rotatably mounted in horizontally extending slots 24 formed in the arm 12. As shown, the crank-arm 21 extends substantially at right angles to the main portion of the lever, and during movement of the lever the pin 23 is adapted to ride back and forth in the slots 24. The channel or passageway 18 formed in the plunger 13 provides means for supplying lubricant to the pivot 22 for the plunger.

Referring more particularly to the rotatable cutter head, it can be seen that the same includes a main body plate 25 having depending side flanges 26 for receiving the back 27 of the cutter 28. The cutter 28 includes a plurality of rows of equidistantly spaced knives 29, and the knives of each row are provided with depending, sharp, equidistantly spaced cutting fingers 30. The fingers 30 are of a substantially wedge shape in end elevation, and the same taper from their sharpening edges 30 toward the back 27. The knives 29 are firmly anchored and cast right in the back, so as to prevent loosening and breaking of the knives.

The depending flanges 26 of the plate 25 prevent shifting of the knife back 27, and the knife back is rigidly secured to the plate 25 by means of screws 31, which extend through the plate 25 into the back. Obviously, by removing the screws 31 the cutting knife 28 can be removed.

Rigidly secured to the plate 25 is a stud 32, which is rotatably received within a bearing socket 33 carried by the lower end of the plunger 13. This socket 33 can be threaded into the plunger and held against accidental movement by means of an axially disposed cap screw 34.

The bearing stud 32 has formed on its outer surface an annular groove 35 which detachably receives the U-shaped holding pin 36. This pin 36 is inserted through the bearing socket 33 into the annular groove 35 through ways 37 formed in said bearing socket.

Obviously, the pin 36 rotatably supports the head, and by withdrawing the U-shaped pin 36 the head can be quickly removed from the plunger. A handle 38 can be carried by the plate 25, so as to permit the convenient turning of the head on the plunger, for a purpose which will be later set forth.

As brought out, the plunger and its head is movable toward and away from the base 10 by means of the operating lever 15, and it is preferred to provide a meat board 39 on the base for receiving the meat to be acted on.

This board 39 is formed relatively long so as to receive steaks of different lengths, and the board is adapted to be slid along the base so that the meat can be progressively moved under the cutting knives. To facilitate the movement of the board 39, guide studs 40 are carried by the base 10, and these studs 40 can be provided with anti-friction sleeves 41, which freely rotate on said studs.

After the knives have been forced through the meat, there is a tendency for the meat to adhere to the knives. Consequently, novel means is provided for quickly and automatically removing the meat from the knives. This means includes a stripper plate 42 having a plurality of equidistantly spaced slots 43 through which normally protrude the rows of cutting knives 29.

The stripper plate underlies the main plate 25, and has secured to its side edges slide bars 44, which slidably engage the sides of the plate 25. Projecting laterally from the sides of the plate 25 are supporting brackets 46, and these brackets are rigidly secured to the plate 25 by means of suitable fastening elements, such as screws 47.

Slidably extending through the brackets 46 are guide rods 48, and the lower ends of these guide rods are firmly anchored in the slide bars 44. The upper ends of the guide rods 48 have formed thereon or secured thereto heads 49 against which bear the upper ends of spiral expansion springs 50. The lower ends of the springs 50 bear against the brackets 46, and consequently the springs 50 function to normally hold the slide bars 44 and the stripper plate 42 in a raised position, with the knives 29 protruding through the slots in said stripper plate.

The central portions of the slide bars 44 have formed thereon upwardly extending arms 51 which carry wear and strike plate 52. These wear and strike plates are held in position against accidental movement by means of set screws 53.

Slidably mounted upon the plunger 13 above the plate 25 is a trip head 54. This trip head 54 embodies an axially disposed hub 55 for receiving the plunger and radially extending trip arms 56. The outer ends of the trip arms 56 carry outwardly extending trip plungers 57, and the lower faces of the plungers have secured thereto, by means of machine screws or the like 58, wear plates 59.

The plungers 57 and their wear plates 59 are normally projected over the plates 52 by means of expansion springs 60 confined in the sockets for the plungers and between the inner ends of said plungers and the rear walls of the sockets. By referring to Figure 2, it can be seen that the plungers 57 and their plates 59 engage the strike blocks 52.

The trip head 55 is normally held in a raised position above the main plate 25 by means of relatively heavy expansion coil springs 61. These springs have their opposite ends bearing against the plate 25 and the trip head 55. Guide rods 62 are carried by the plate 25 and are slidably received in guide sockets 63 formed in the trip head 54.

From the description so far, it can be seen that when the operating lever 15 is swung forwardly, the cutter head with the cutting knives will be moved downwardly toward the board 39. Upon reverse movement of the lever, the plunger, the plate 25, the cutting knives, and the trip head 54 will be raised. When the trip head 54 strikes the lower end of the arm 12 of the standard 11, the same will be held against further movement, and upon continued upward movement of the plunger and the plate 25 against the tension of the coil springs 61, the stripper plate 42 will be held against movement due to the engagement of the wear plates 59 with the wear blocks 52. Thus, as the knives continue to move upward, the plate 42 will strip the meat from the knives.

Means is also provided for quickly and automatically returning the stripper plate to its normal position. This means includes vertically sliding dogs 64 carried by the trip arms 56 of the trip head 54. The trip dogs are of a U-shape in side elevation, and the legs thereof are mounted in guide grooves or tracks 65 formed in said trip arms 56. The legs of the dogs have formed therein inclined grooves 66, which slidably receive the terminals of an operating pin 67, which is rigidly carried by the strike plunger 57. These pins 67 are slidably mounted in horizontal slots 56' formed in the arms 56.

By this construction, when the strike head 54 is held against further upward movement, the lower ends of the trip dogs 64 will engage the upper surface of the plate 25, and continued upward movement of the plate 25 will raise the dogs, causing the pins 67 to travel in the inclined grooves 66. The inclined surfaces of the grooves will force the pins 67 and their strike plungers 57 inwardly and away from the wear blocks 52. As soon as the plungers move away from the wear blocks 52, the tension springs 50 for the stripper plate 42 will quickly return the stripper plate to its raised position. When the cutter head is again lowered by the lever 15, the plungers 57 will again snap over the upper ends of the trip arms 51 of the slide blocks 44.

Due to the quick return of the stripper plate 42 there is a likelihood of an objectionable snap or noise. This is lessened due to the fact that the knives 29 are of a wedge shape, and thus the walls of the slots 43 of the stripper plate gradually engage the thickest portion of the knives and are brought to a gradual stop. Also, the air will be confined between the stripper plate 42 and the back 27 of the knives, giving a cushioning effect.

Figure 2:
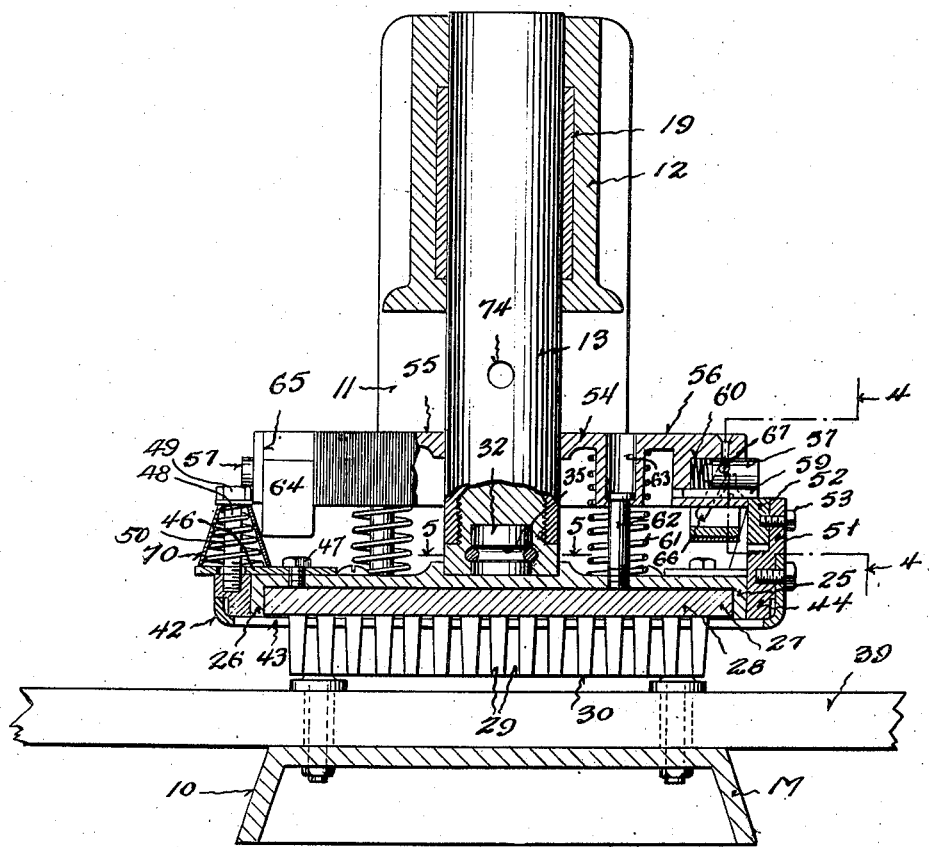
Figure 2 is a transverse section through the improved machine showing the head in its lowered position, the view being taken substantially on the line 2—2 of Figure 1.
Figure 4:
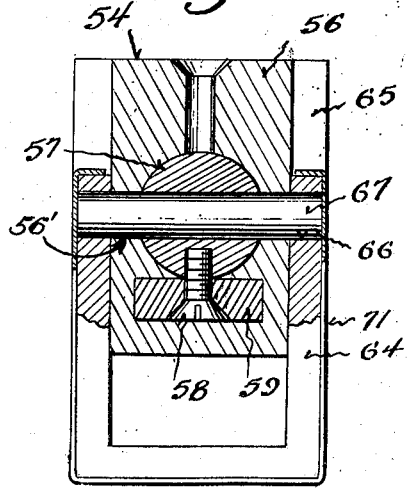
Figure 4 is an enlarged detail view taken substantially on the line 4—4 of Figure 2, illustrating the releasing means for the cutting head.
Figure 5:
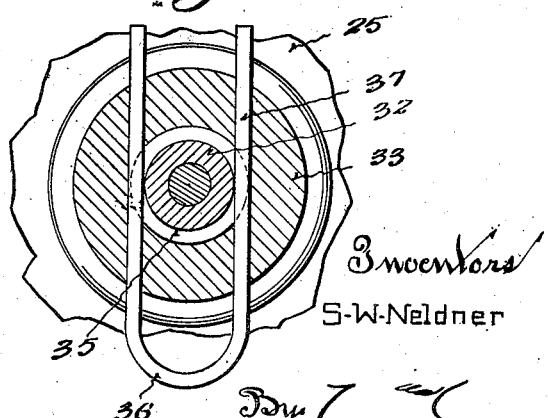
Figure 5 is an enlarged detail section taken substantially on the line 5—5 of Figure 2, illustrating the means for detachably and rotatably connecting the cutter head with the plunger.

As illustrated in Figures 1, 2, and 3, the tension springs 50 for the stripper plate can be provided with flexible covers 70, and these covers act as a guard for the springs. Also, the vertically moving trip dogs 64 can be provided with resilient metal covers 71, which are snapped over the dogs.

To prevent accidental movement of the lever 15 and the head 25, a safety 72 can be provided. This safety 72 includes a spring-pressed plunger 73, which is normally urged toward the plunger 13 and into a keeper recess 74 in said plunger when the plunger is in a partially elevated position. Obviously, when the spring-pressed plunger 73 is in the keeper opening 74, movement of the plunger 13 is prevented, and all parts of the device are locked.

To render the plunger 73 inoperative during normal operation of the lever, the plunger 73 can carry a cross-pin 75. By turning the plunger, the cross-pin 75 can be placed in registration with grooves 76 formed in the outer end of the plunger casing, which will allow inward movement of the plunger to its fullest extent.

However, when the plunger is pulled out and the pin 75 is moved out of registration with the grooves 76, the pin will engage the outer face of the casing and hold the plunger against inward movement and away from the keeper recess 74.

From the foregoing description, it can be seen that when the plunger and head is moved downwardly by the lever 15, a series of rows of cuts will be made in the meat. These cuts are indicated by the reference character 77 in Figure 6 of the drawings.

After these cuts have been made, the cutter head is rotated by means of the handle 38 a quarter of a turn, so that upon the next downward stroke of the cutter head and the plunger, a series of rows of cuts will be made at right angles to the first cuts. The second rows of cuts are shown in dotted lines in Figure 6 and are indicated by the reference character 78.

The cutter head is so pivoted that the second row of cuts will be between the first row of cuts made and spaced therefrom. This prevents the mangling of the meat and insures the thorough and quick cooking thereof.

Obviously, when the meat has been treated on one side, the same is turned and cut on the other. The particular type of cuts made in the meat is obtained by the staggering of the points of the knives of one row relative to the points of the knives in the adjacent rows, and by pivoting the plate 25 slightly offcenter.

In Figure 6, the true center is shown by the dotted line circle and indicated by the reference character 79. The actual and offcenter pivot point of the head is indicated by the full line circle in Figure 6 and by the reference character 80.

From the foregoing description it can be seen that an exceptionally simple and durable meat tendering machine has been provided, which will effectively accomplish its purpose with the expenditure of a minimum amount of time and effort on the part of the operator.

Changes in details may be made without departing from the spirit or the scope of this invention, but what is claimed as new is:

1. A meat tenderer comprising a base, a standard on one end of said base having a forwardly extending arm overlying the base, a plunger slidably mounted in said arm, means for raising and lowering the plunger, a head, a cutter carried by said head having a plurality of rows of cutting knives, a bearing stud on said head having an annular groove, a bearing socket carried by the lower end of the plunger for rotatably and removably receiving the stud, said plunger having spaced ways communicating with the bore of the socket, and a removable U-shaped pin detachably fitted in said ways for engaging the walls of the annular groove to rotatably and detachably support said head.

2. A meat tenderer comprising a base, a standard on one end of said base having a forwardly extending arm overlying the base, a plunger slidably mounted in said arm, means for raising and lowering the plunger, a head, a cutter carried by said head having a plurality of rows of cutting knives, a bearing stud on said head having an annular groove, a bearing socket carried by the lower end of the plunger for rotatably and removably receiving the stud, said plunger having spaced ways communicating with the bore of the socket, and a removable U-shaped pin detachably fitted in said ways for engaging the walls of the annular groove to rotatably and detachably support said head, said stud being off center, as and for the purpose specified.

3. A meat tenderer comprising a base, a standard on one end of said base having an arm overlying the base, a bearing sleeve on said arm, a plunger slidably mounted in said bearing sleeve, a head connected with said plunger, a cutter detachably carried by said head including a plurality of rows of knives, a bell crank-shaped operating lever, a pivot pin carried by said lever, the arm having slots therein for slidably receiving the terminals of the pin, and a pivot pin connecting the extreme lower end of the lever to the plunger.

4. A meat tendered comprising a base, a standard on one end of said base having an arm overlying said base, a plunger slidably carried by said arm, a head connected to the lower end of the plunger, a cutter on said head including a plurality of rows of spaced knives, a vertically movable stripper plate on said head having rows of slots receiving said knives, resilient means normally holding the stripper plate in a raised position, means for automatically moving the stripper plate toward the lower ends of said knives when the head has been raised to a predetermined position, and means for automatically returning the stripper plate to its raised inoperative position upon continued raising movement of the head.

5. A meat tenderer comprising a base, a standard formed on one end of the base having an arm extending over said base, a vertically disposed bearing sleeve on said arm, a plunger slidably mounted in the sleeve, means for operating said plunger, a head rigidly connected with the lower end of the plunger for movement therewith, a cutter connected to said head including a plurality of rows of depending knives, a stripper plate for said knives, having a series of rows of slots for receiving said knives, spring means normally holding the stripper plate in a raised position, and means for depressing the stripper plate when the head has been raised to a predetermined position including a strike arm slidably mounted on the plunger, spring means normally holding the strike arm in a raised position, and strike plungers on said arm for engaging the stripper plate when the head is raised and when the strike arm is depressed by engagement with the lower end of the sleeve.

6. A meat tenderer comprising a base, a standard formed on one end of the base having an arm extending over said base, a vertically disposed bearing sleeve on said arm, a plunger slidably mounted in the sleeve, means for operating said plunger, a head rigidly connected with the lower end of the plunger for movement therewith, a cutter connected to said head including a plurality of rows of depending knives, a stripper plate for said knives having a series of rows of slots for receiving said knives, spring means normally holding the stripper plate in a raised position, means for depressing the stripper plate when the head has been raised to a predetermined position including a strike arm slidably mounted on the plunger, spring means normally holding the strike arm in a raised position, and strike plungers on said arm for engaging the stripper plate when the head is raised and when the strike arm is depressed by engagement with the lower end of the sleeve, and means for releasing the plunger when the head is elevated to a further position.

7. A meat tenderer comprising a base, a standard formed on one end of said base, an arm on the standard overlying the base, a vertically disposed guide sleeve on the arm, a plunger slidably mounted in the sleeve, a head secured to the lower end of the plunger for movement therewith, a cutter carried by the head including a plurality of rows of depending knives, a stripper for said knives including a plate having a plurality of slots for receiving the knives, trip arms on the sides of the plate normally extending above the head, a strike arm slidably mounted on the plunger and disposed between the head and the sleeve, spring means normally holding the strike arm in a raised position above said head, outwardly extending spring-pressed plungers carried by the terminals of the strike arm and normally disposed in the path of the trip arms, whereby upon upward movement of the head, the strike arm will engage the sleeve and be held against movement so that said plungers engaging the trip arms will cause downward movement of the stripper plate relative to the cutter.

8. A meat tenderer comprising a base, a standard formed on one end of said base, an arm on the standard overlying the base, a vertically disposed guide sleeve on the arm, a plunger slidably mounted in the sleeve, a head secured to the lower end of the plunger for movement therewith, a cutter carried by the head including a plurality of rows of depending knives, a stripper for said knives including a plate having a plurality of slots for receiving the knives, trip arms on the sides of the plate normally extending above the head, a strike arm slidably mounted on the plunger and disposed between the head and the sleeve, spring means normally holding the strike arm in a raised position above said head, outwardly extending spring-pressed plungers carried by the terminals of the strike arm and normally disposed in the path of the trip arms, whereby upon upward movement of the head, the strike arm will engage the sleeve and be held against movement so that said plungers engaging the trip arms will cause downward movement of the stripper plate relative to the cutter, and means for automatically moving the plungers away from the trip arms when the head has been raised to a further elevated position.

9. A meat tenderer comprising a base, a standard on one end of said base having a forwardly projecting arm, a vertically disposed guide sleeve on said arm, a plunger slidably mounted in the guide sleeve, means for operating said plunger, a head connected to the lower end of the plunger for movement with said plunger, a cutter connected to said head including a plurality of rows of depending knives, a stripper for said knives including a stripper plate having rows of slots therein receiving the knives, slide bars on the ends of the strip plate engaging the sides of the head, trip arms on the slide bars, a strike arm slidably mounted on the plunger and disposed between the sleeve and said head, spring means normally holding the strike arm above the head, spring means normally holding the stripper plate in a raised position against said head, spring-pressed plungers carried by the terminals of the strike arm normally disposed in the path of the trip arms, whereby a raising movement of the head and engagement of the strike arm with the sleeve will cause the depression of the stripper plate by said plungers, and means for automatically moving said plungers inwardly away from the trip arms including vertically movable dogs carried by the strike arm for engagement with said head upon depression of the strike arm, and pins carried by said plungers, the vertically movable dogs having inclined slots receiving said pins.

STEPHEN W. NELDNER.